United States Patent
Buelow et al.

(10) Patent No.: US 9,063,588 B2
(45) Date of Patent: Jun. 23, 2015

(54) GRIP-ENABLED TOUCHSCREEN STYLUS

(71) Applicants: Todd M. Buelow, Chanhassen, MN (US); Farhad Nourbakhsh, Apple Valley, MN (US)

(72) Inventors: Todd M. Buelow, Chanhassen, MN (US); Farhad Nourbakhsh, Apple Valley, MN (US)

(73) Assignee: BBY Solutions, Inc., Richfield, MN (US)

( * ) Notice: Subject to any disclaimer, the term of this patent is extended or adjusted under 35 U.S.C. 154(b) by 24 days.

(21) Appl. No.: 13/795,252

(22) Filed: Mar. 12, 2013

(65) Prior Publication Data

US 2014/0267180 A1    Sep. 18, 2014

(51) Int. Cl.
    *G06F 3/0354*    (2013.01)
    *G06F 3/044*    (2006.01)

(52) U.S. Cl.
    CPC ............ *G06F 3/03545* (2013.01); *G06F 3/044* (2013.01)

(58) Field of Classification Search
    CPC ..... G06K 7/10544; G06K 9/222; G06F 3/044
    USPC .................................................. 345/179–184
    See application file for complete search history.

(56) References Cited

U.S. PATENT DOCUMENTS

| | | | |
|---|---|---|---|
| 4,076,427 A | 2/1978 | Anderson | |
| 4,270,870 A | 6/1981 | Hashimoto et al. | |
| 4,358,210 A | 11/1982 | Hashimoto et al. | |
| 4,381,158 A | 4/1983 | Garganese | |
| 4,475,834 A | 10/1984 | Bean | |
| 4,955,739 A | 9/1990 | Kageyama et al. | |
| 4,979,839 A | 12/1990 | Hashimoto et al. | |
| 5,004,871 A | 4/1991 | Purcell | |
| 5,702,193 A | 12/1997 | Kageyama et al. | |
| 5,999,170 A * | 12/1999 | Ooura et al. | 345/179 |
| 6,335,727 B1 * | 1/2002 | Morishita et al. | 345/179 |
| 7,226,229 B1 | 6/2007 | Register | |
| 7,612,767 B1 | 11/2009 | Griffin et al. | |
| 8,125,469 B2 | 2/2012 | Badaye et al. | |
| 8,292,530 B2 | 10/2012 | Tamano et al. | |
| 8,648,837 B1 * | 2/2014 | Tran et al. | 345/179 |
| 2002/0097223 A1 * | 7/2002 | Rosenberg | 345/157 |
| 2005/0239191 A1 * | 10/2005 | Prins | 435/287.1 |
| 2009/0289922 A1 * | 11/2009 | Henry | 345/179 |
| 2011/0229245 A1 | 9/2011 | Wang | |
| 2012/0268429 A1 * | 10/2012 | Lee et al. | 345/179 |
| 2012/0317194 A1 | 12/2012 | Tian | |

* cited by examiner

*Primary Examiner* — Charles V Hicks
*Assistant Examiner* — Charles Zheng
(74) *Attorney, Agent, or Firm* — Beck Tysver Evans PLLC

(57) ABSTRACT

A grip-enabled touchscreen stylus for teaching a proper writing grip comprises a stylus shaft and a stylus tip for writing on a capacitive touchscreen electronic device. Three buttons situated around the stylus shaft activate the stylus tip. The stylus has a normally-off state, in which the tip is disabled and cannot interact with a touchscreen. When a thumb, index, and middle finger of a hand correctly grip the stylus by pressing all three buttons simultaneously, an actuator within the stylus causes the tip to activate in order to interact with the touchscreen. The stylus actuator may be mechanical, electronic, or electromechanical. The stylus may be supplemented by software or logic on the touchscreen-enabled device enabling the desired user experience of requiring proper grip on the stylus for touchscreen input to be validated.

22 Claims, 7 Drawing Sheets

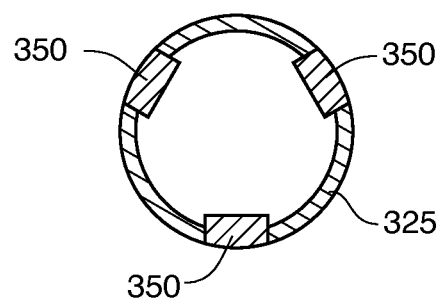
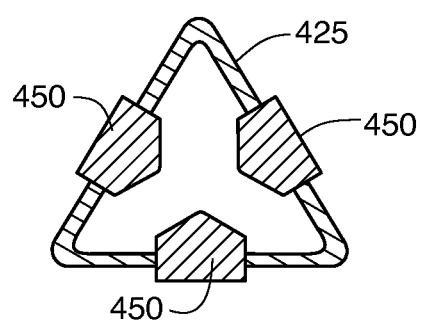

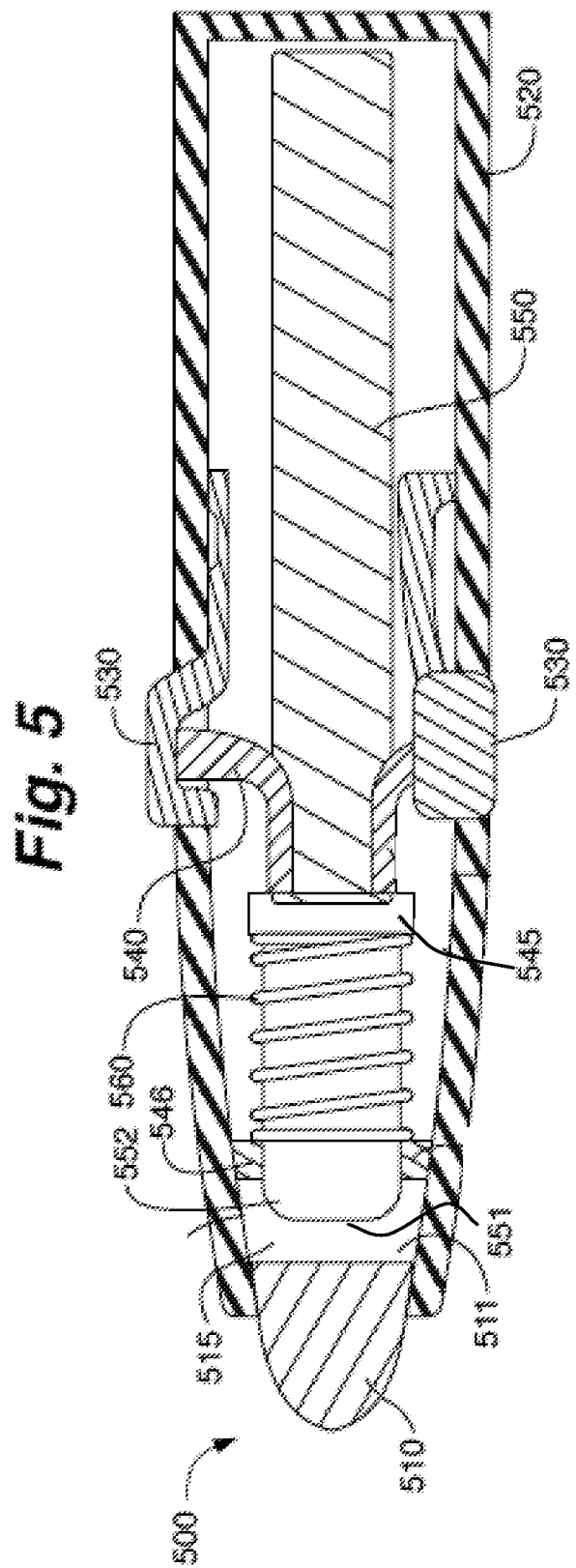

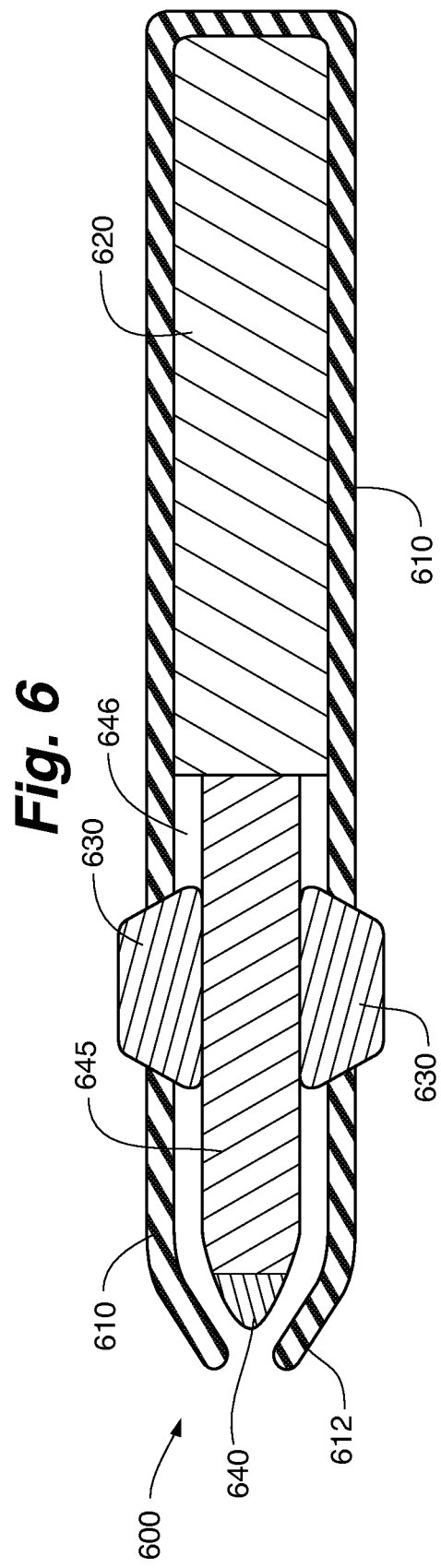

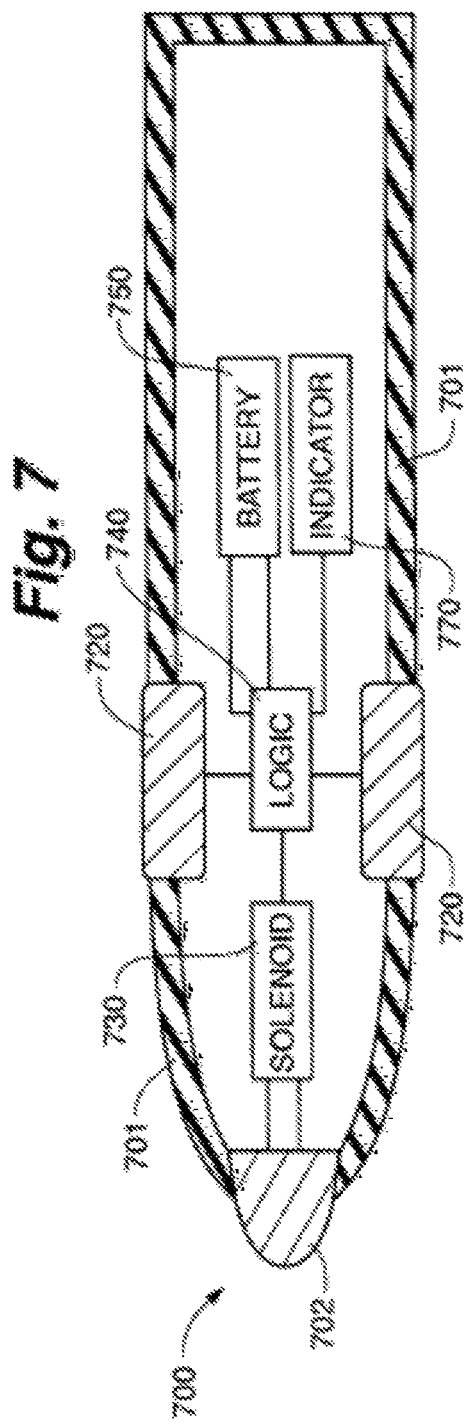

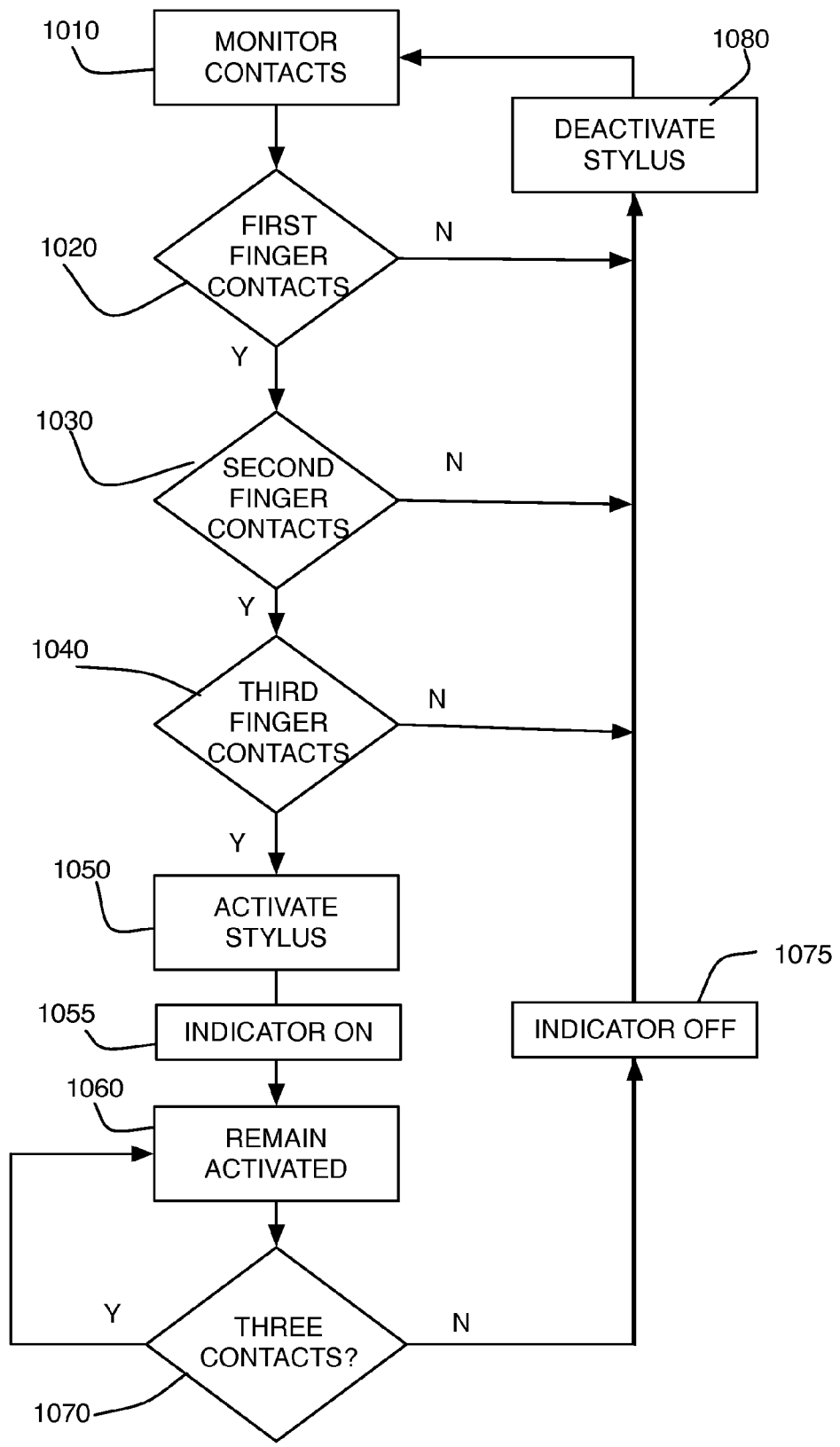

GRIP-ENABLED TOUCHSCREEN STYLUS

FIELD OF THE INVENTION

The present application relates to the field of writing instruments for touchscreen electronic devices. More particularly, the described embodiments relate to a touchscreen stylus with a grip-enabled writing tip.

BACKGROUND

Styluses for capacitive touchscreen devices have writing tips made of electrically-conducting material such as conducting foam or conducting rubber. Other conductors such as metal could be used, however a soft material is preferred because metal could damage a touchscreen surface. In one type of passive stylus, the stylus shaft is formed of an electrically-conducting material that transfers charge from a user's hand to the conducting tip. An alternate design (an "active stylus") may include an external power source (e.g. a battery) to provide additional functionality to the stylus. This functionality may be manifested either by providing additional means of affecting the capacitive touch interaction or by enabling communication with the touch-enabled devices by other means, supplementing the user experience.

Prior art styluses are designed to function anytime the user brings the stylus in contact with a touchscreen surface, independent of how the stylus is gripped in the user's hand. The standard writing grip for a writing instrument is a tripod grip, in which the thumb, index, and middle fingers simultaneously contact the shaft of the writing instrument. Conventional touchscreen styluses do not distinguish between a proper tripod writing grip and an incorrect grip, such as an overhand first grip that a young child may use.

SUMMARY

One embodiment of the present invention provides a touchscreen stylus having a tip that can be dynamically activated or inactivated based upon the user's grip on the stylus. The stylus may be used with capacitive touchscreens such as those found on electronic devices. Such devices include computer monitors, video screens, laptops, tablet computers, smartphones, kiosks, and other devices combining a visual display with touchscreen technology. The stylus may be used to teach a child the correct handwriting grip for a writing instrument. When a proper writing grip is achieved by correctly positioning the thumb, index, and middle fingers on the stylus shaft, the stylus tip activates and subsequently can be used with a touchscreen device. When a hand is not gripping the stylus, or if the hand is not positioned correctly, the stylus writing tip does not function with a touchscreen device.

In conjunction with the stylus, software on the touchscreen device may be provided. The software would reduce, disable, or alter the input via traditional touch from the user's finger or palm so as to encourage the user to utilize the stylus. Additionally, software could be provided in conjunction with an active stylus design that reduces, disables, or alters input from the active stylus, based upon wireless communication with the active stylus.

BRIEF DESCRIPTION OF THE DRAWINGS

FIG. 3 is a cross-sectional view of a first embodiment of the grip-enabled stylus.

FIG. 4 is a cross-sectional view of a second embodiment.

FIG. 5 is a longitudinal sectional view of a mechanical embodiment.

FIG. 6 is a longitudinal sectional view of a second mechanical embodiment.

FIG. 7 is a schematic diagram of an electronic embodiment.

FIG. 10 is a flow chart showing a method for using a touchscreen stylus.

DETAILED DESCRIPTION

Figure 1:
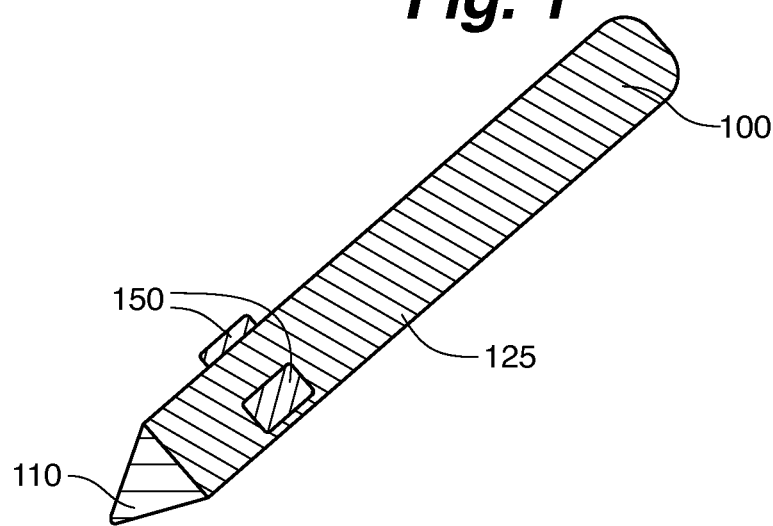
FIG. 1 is a perspective view of a grip-enabled touchscreen stylus.

FIG. 1 shows a grip-enabled touchscreen stylus 100 that promotes the use of the tripod writing grip, in which the thumb, index, and middle fingers simultaneously contact the shaft of the writing instrument. The stylus 100 includes a tip 110 and a shaft 125. Buttons 150 around the shaft 125 are provided as a tip-activation mechanism for the stylus. The word "button" as used herein may describe a retractable mechanical button, a push-button responding to a force perpendicular to shaft 125, a switch, a sensor, or other type of structure or mechanism placed at a predetermined location on the stylus shaft 125. In the preferred embodiment buttons 150 are positioned evenly around a circumference of the shaft 125. When a hand correctly grips the pen using a tripod writing grip, buttons 150 are depressed and the tip 110 becomes active and can be used to interact with a capacitive touchscreen. If not all buttons 150 are depressed, the tip 110 will not be active and will not interact with the touchscreen.

Figure 2:
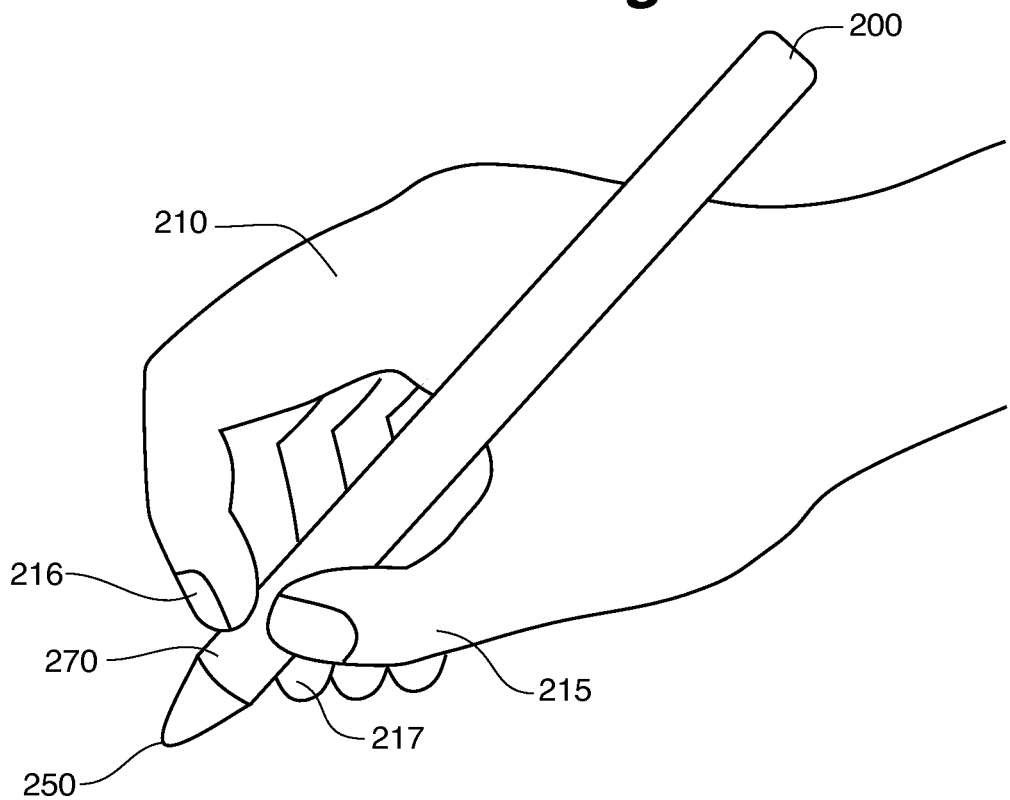
FIG. 2 shows a hand demonstrating a tripod writing grip.

FIG. 2 shows a correct tripod writing grip of a stylus 200 by a hand 210. An index finger 216, middle finger 217, and thumb 215 of hand 210 surround the stylus shaft 270. When the hand 210 grips stylus 200 in this manner, the stylus tip 250 is activated and the stylus 200 can be used to write on a capacitive touchscreen.

The cross-sectional shape of the grip-enabled stylus can be implemented in a number of ways. FIG. 3 shows an exemplary embodiment of the grip-enabled stylus having a cylindrical shaft. Three buttons 350 are disposed around the cross-sectional circumference of shaft 325. In this embodiment, buttons 350 may be electronic sensors that are flush with an outside surface of shaft 325.

FIG. 4 shows another exemplary embodiment of the stylus having a shaft with a triangular cross-section to promote the use of the tripod grip. Three mechanical buttons 450 partially protrude from the stylus shaft 425. The three buttons 450 are disposed evenly around the cross-sectional perimeter of the stylus shaft 425. When all three buttons 450 are simultaneously depressed by a thumb, index, and middle finger, the buttons 450 retract into the interior of the stylus shaft, causing a mechanism within the stylus shaft to activate the stylus tip for use with a touchscreen.

In alternative embodiments, the cross-sectional perimeter of the stylus could be an alternative geometric shape, such as hexagonal, octagonal, irregular, etc.

Although FIGS. 3-4 show buttons 350, 450 as being aligned in a cross-section of the stylus shaft 325, 425 (i.e., equidistant from the stylus tip), the buttons 350, 450 could be non-aligned around the stylus shaft 325, 425, such that one or more of the buttons 350, 450 may be closer to the stylus tip than other buttons. This may be the case when the stylus has a customized irregular or ergonomic cross-section.

FIG. 5 shows a mechanical embodiment of a grip-enabled stylus 500. Stylus 500 has a tip 510 that is preferably made of an electrically-conductive foam, conductive rubber, or similar conducting material. Shaft 520 is made of an insulating material that prevents capacitive coupling between a user's hand and the tip 510 when the user grips the stylus 500. Shaft 520 could alternatively be made of a conductive material, in which case an insulating material would be placed between shaft 520 and tip 510. Stylus 500 may have a circular or triangular cross-section as shown in FIGS. 3-4, or the stylus 500 may have another cross-sectional shape. A plunger 550 made of an electrically-conducting material is situated within the shaft 520. The plunger may be formed of conducting foam, conducting rubber, metal, or other similar conducting material. A first ring 545 is fixed to plunger 550, and a second ring 546 is fixed to shaft 520. A spring coil 560 encircling plunger 550 can be compressed between rings 545, 546.

Three buttons 530 partially protrude from shaft 520 (only two buttons 530 are shown in the longitudinal cross-section of FIG. 5). Buttons 530 are constructed of an electrically-conducting material that can transfer charge from a hand to the tip 510. When depressed by fingers gripping the stylus 500, buttons 530 retract inside the shaft 520 and displace joint arms 540. Each joint arm 540 in turn provides a force to move ring 545 toward ring 546 against the resistance of spring 560. This causes a head 551 of plunger 550 to move toward and make contact with the interior end 511 of tip 510. Head 551 and interior end 511 are normally separated by a gap 515, which prevents charge flow to the stylus tip 510.

In the embodiment of FIG. 5, the stylus tip becomes active when a hand correctly gripping the stylus causes the head 551 of plunger 550 to make contact with tip 510 at interior end 511 inside of the shaft 520. The user's hand capacitively couples with the stylus tip 510 via the electrically-conducting buttons 530, joint arm 540, ring 545, and plunger 550. A capacitive touchscreen can then detect the tip 510 and register a touch when tip 510 is pressed against the surface of the capacitive touchscreen.

In a preferred embodiment of FIG. 5, all of buttons 530 must be depressed before plunger 550 makes contact with tip 510. One way this may be accomplished is by choosing a spring 560 having sufficient resistance to compression that only the combination of force from three buttons 530 can overcome the resistance of spring 560. Other mechanisms are contemplated, and will be apparent to those skilled in the art.

Optionally, in addition to the buttons 530 the stylus 500 may include an override mechanism that would eliminate the need to contact the three buttons 530 to activate the stylus. The override mechanism may be an end knock as described in U.S. Pat. No. 8,292,530, which provides a cam and a knock rod at the top end of the writing instrument to extend and retract the plunger.

FIG. 6 shows an alternative mechanical embodiment of a grip-enabled stylus 600. The stylus 600 comprises a shaft 610 having three electrically-conducting buttons 630 partially protruding from the shaft 610. Stylus 600 may have a circular or triangular cross-section as shown in FIGS. 3-4, or the stylus 600 may have another cross-sectional shape. An electrically-conducting stylus tip 640 is affixed to a plunger 645. The stylus tip 640 may be formed of a carbon-impregnated, electrically-conducting foam. The plunger 645 may be made of an electrically-conducting gel or fluid, or an amorphous, sealed vessel made of an electrically conductive material containing a gel or fluid. Alternatively, the plunger 645 may be formed of a carbon-impregnated soft foam of the correct shape and density such that it elongates substantially upon pressure from buttons 630 to extend the stylus tip 640 outside the opening 612. The plunger 645 has elastic properties, such that when a thumb, index finger, and middle finger grip the stylus 600 by depressing three buttons 630 simultaneously, the buttons 630 displace the plunger 645 within the shaft 610. Plunger 610 will then become deformed, filling the interior space 646 of shaft 610 and pushing tip 640 beyond the end 612 of shaft 610. The volume of fluid displaced by buttons 630 is preferably calibrated such that that depressing only two of the buttons 630 will not displace the plunger 645 far enough for the tip 640 to emerge from the stylus end 612.

Plunger 645 may fill the entire cavity of the shaft 610, or the shaft 610 may be partially filled with an inflexible fill material 620, such as a rigid polymer, plastic, or metal material. Material 620 may also be provided to balance the weight of the stylus when a user writes on a touchscreen.

In an alternative configuration of the embodiment of FIG. 6, the stylus tip 640 could be fixed to the shaft 610 instead of being fixed to the plunger 645. In this embodiment the tip 640 and plunger 645 would normally be separated by a gap similar to gap 515 of FIG. 5. In this alternative embodiment, depressing the buttons 630 would deform the electrically-conducting fluid, gel, or vessel and cause plunger 645 to close the gap and contact the tip 640 only when all three buttons 630 are depressed.

FIG. 7 shows an exemplary electronic embodiment of the grip-enabled stylus 700. The stylus 700 comprises a stylus shaft 701, an electrically-conducting stylus tip 702, and three sensors 720 distributed circumferentially around the shaft 701 (only two of the three sensors 720 are shown in FIG. 7). The stylus 700 may have a cross-section similar to those shown in FIGS. 3-4. A solenoid 730 is powered by a battery 750, and controlled by logic 740. Sensors 720 could be capacitive touch sensors, resistance sensors, heat sensors, pressure sensors, or light sensors. Other types of sensors could also be used. Each sensor 720 sends a continuous signal to logic 740 when the sensor 720 detects the presence of a finger touching the surface of the sensor 720. The sensor 720 stops sending the signal when the sensor 720 detects that a finger is no longer touching the sensor 720.

Logic 740 is configured to receive a signal from each of the three sensors 720. When logic 740 determines that all three sensors 720 are simultaneously pressed (e.g., by a thumb, index, and middle finger of a user's hand), the logic 740 causes the battery 750 to provide electric current to activate solenoid 730. The solenoid 730 transfers an electrical charge to the tip 702, allowing the tip 702 to be detected by a capacitive touchscreen.

In an alternative embodiment of the stylus, the logic could operate to activate the stylus when the three sensors are simultaneously contacted, then subsequently allow the stylus to remain in an ON state. In this embodiment a user would manually press an OFF button or switch to deactivate the stylus. The stylus could also contain an override mechanism such as an ON/OFF button or switch, which would allow the user to activate the stylus without simultaneously contacting the sensors 720. Onboard logic and wireless communication with the touchscreen-enabled devices may also dictate the terms of the stylus enablement/disablement should certain applications call for this functionality.

Stylus 700 may optionally have an indicator 770 to notify the user when the stylus 700 becomes active or inactive. The indicator 770 preferably produces light, sound, or vibration that can be seen, heard, or felt by a user of the stylus. For example, indicator 770 may be a light-emitting diode that is lit only when all three sensors 720 detect a contact. Such a light-emitting diode could also change colors or blink, etc. Indicator 770 could also be a speaker that emits a noise when the logic 740 first detects that all three sensors 720 have been pressed by the user's fingers.

Figure 8:
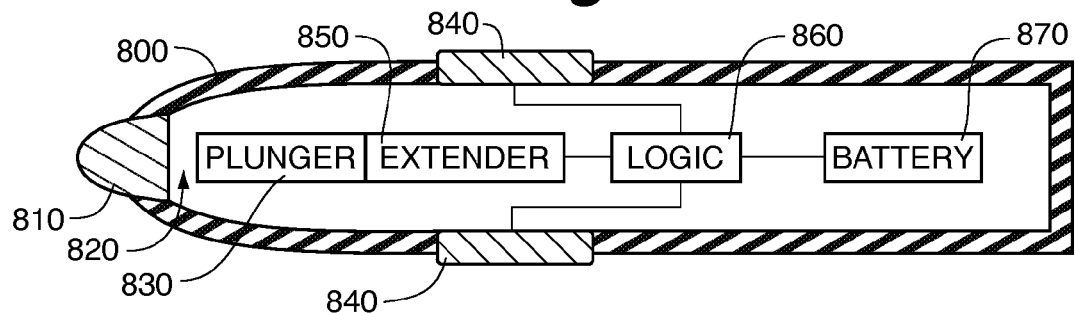
FIG. 8 is a schematic diagram showing an electromechanical embodiment.

In another embodiment of the grip-enabled stylus, a stylus actuator could be hybridized to act as an electromechanical stylus. In the embodiment of FIG. 8, the mechanical plunger-type stylus of FIG. 5 is combined with the electronic-type stylus of FIG. 7. The stylus shown in FIG. 8 has a shaft 800, a stylus tip 810, and an electrically-conducting plunger 830 physically and electrically isolated from stylus tip 810 by a gap 820. A battery 870 powers the electromechanical stylus. Three sensors 840 around a circumference of the shaft 800 each send a signal to logic 860 when the sensors 840 detect the presence of a finger on the stylus shaft. When logic 860 receives signals from all three sensors 840 simultaneously, the logic 860 causes an electromechanical extender 850 to extend the plunger 820 toward tip 810 to close the gap 820 between the plunger 830 and tip 810. The extender 850 may include a solenoid to activate tip 810. When the plunger 830 and tip 810 make contact, the stylus tip 810 becomes activated. If one or more of the sensors 840 discontinue sending a signal to logic 860, such as when a finger is no longer in contact with a sensor 840, the logic causes the extender to retract, opening the gap 820 and breaking electrical contact between plunger 830 and tip 810.

Figure 9:
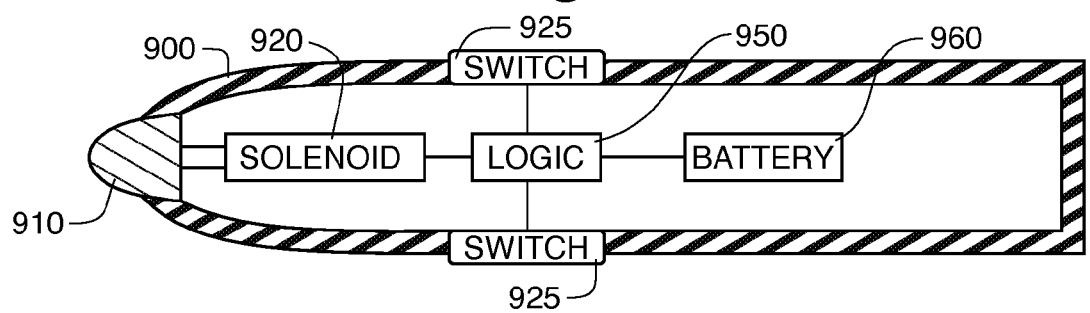
FIG. 9 is a schematic diagram showing a second electromechanical embodiment.

In another electromechanical embodiment shown in FIG. 9, a stylus includes a stylus shaft 900, a stylus tip 910, and three normally-off mechanical switches 925 around a circumference of shaft 900. A battery 960 powers the electromechanical stylus. When a hand correctly grips the stylus shaft 900 using a tripod grip, the three mechanical switches 925 connected to logic 950 signal the logic 950 to cause the battery 960 to power a solenoid 920. The solenoid 920 actuates the stylus tip 910. If the hand ceases to correctly grip the stylus, one or more of the switches 920 will return to its normally-off state, and logic 950 will cause the battery to stop providing power to solenoid 920, thus deactivating the stylus tip 910.

In an alternative embodiment of the electromechanical stylus of FIG. 9, the stylus activation buttons could comprise one mechanical switch 925 and two sensors. In this embodiment the mechanical switch could set the stylus to an ON state, and logic within the stylus would activate the solenoid 920 only when the two sensors and the mechanical switch 925 are simultaneously contacted.

Computer programming or software may be provided for use with the grip-enabled stylus. The software is preferably configured to support the use of the stylus and encourage use of the proper writing grip. One feature of the programming may prevent the computer from recognizing the user's finger as a touch command. The software may accomplish this by only responding to a touch confined in a small area, such as a few square millimeters, and disregarding touches that cover a larger area of the touchscreen.

FIG. 10 is a flow chart showing a method for using a touchscreen stylus. The stylus has a normally-off state, in which the stylus cannot be used to write on a touchscreen electronic device. Although the method is described with reference to FIG. 5, the stylus may be an embodiment as in any of FIGS. 1-9. Although the method is presented as a series of steps, the steps may be executed in a different order, and the method may include more or fewer steps.

In step 1010, the stylus 500 is in a deactivated state and buttons 530 of the stylus 500 are monitored. In an active stylus utilizing sensors, logic 740 within the stylus 700 waits for signals from sensors 720. In a mechanical embodiment of the invention, the monitoring step 1010 consists of the stylus 500 being in the normally-off state in which charge cannot flow to the tip 510 of the stylus 500.

In step 1020, a first finger contacts a first button 530. The "button" may be one of a switch, a sensor, a mechanical actuator, or other similar structure. The button is positioned at a fixed location along the shaft 520 at an ergonomically-appropriate distance from stylus tip 510 so that the first finger contacts the button 530 when the stylus 500 is properly gripped using a tripod writing grip. If the first finger does not contact the first button 530, the stylus 500 remains in the deactivated state. If the first finger has contacted the first button 530, the method proceeds to step 1030. If the second finger has not contacted the second button 530 in step 1030, the stylus 500 remains in the deactivated state. If the second finger has contacted the second button 530, the method proceeds to step 1040. If the third finger has not contacted the third button 530 in step 1040, the stylus 500 remains in the deactivated state.

If the third finger has contacted the third button 530 in step 1040, then the method proceeds to step 1050 in which the stylus 500 is activated and can be used to write on or otherwise interact with a capacitive touchscreen. The stylus may be activated mechanically, electronically, or electromechanically. In one embodiment, in step 1055 an indicator 770 on the stylus 700 is turned on when the stylus 700 is activated. The indicator 770 may be a light, a sound, a vibration, or another type of indicator 770 that communicates to a user that the stylus tip 702 is active. The indicator 770 may be of short duration, (e.g., a brief chime), or the indicator may be of longer duration (e.g., an LED light that remains in an "ON" state while the stylus tip is activated).

In step 1060, the stylus 500 remains activated while all three buttons 530 are contacted by the three fingers. In step 1070, if the three buttons are still contacted, the stylus 500 remains in the active state. If it is determined that not all three buttons 530 are contacted, the method proceeds to step 1080, in which the stylus 500 is deactivated and will not function to write on a capacitive touchscreen. If an indicator 770 was turned on in step 1055, the indicator may be turned off in step 1075. For example, if the indicator 770 is an LED light, the LED light 770 would be turned off in step 1075.

The many features and advantages of the invention are apparent from the above description. Numerous modifications and variations will readily occur to those skilled in the art. For example, the grip-enabled stylus could be altered to have only one button or two buttons to activate the stylus tip. Since such modifications are possible, the invention is not to be limited to the exact construction and operation illustrated and described. Rather, the present invention should be limited only by the following claims.

What is claimed is:
1. A grip-enabled stylus comprising:
   a) a stylus shaft;
   b) an electrically-conducting stylus tip;
   c) a first activation button on the stylus shaft; and
   d) a stylus actuator that causes the stylus tip to become active while the button is continuously contacted by a user, and inactive while the button is not contacted by the user.
2. The stylus of claim 1, wherein the stylus comprises a second activation button and a third activation button, and the first, second, and third activation buttons are distributed around a perimeter of the stylus shaft, and the stylus actuator is further adapted to cause the stylus tip to become active while the three buttons are simultaneously contacted by the user, and inactive while the three buttons are not simultaneously contacted.

3. The stylus of claim 2, further comprising:
   e) an electrically-conducting plunger within the stylus shaft; and
   f) a gap between the plunger and the stylus tip;
   wherein the stylus actuator is configured to cause the plunger to close the gap and create an electrical connection between the plunger and the stylus tip while all three buttons are contacted, and open the gap and break electrical connection with the stylus tip while not all three buttons are contacted.

4. The stylus of claim 3, wherein the stylus actuator is a mechanical actuator.

5. The stylus of claim 3, wherein the stylus actuator is an electronic actuator.

6. The stylus of claim 2, wherein the first activation button is nearer in distance to the stylus tip than the second activation button.

7. The stylus of claim 2, further comprising:
   e) an interior space defined by an inner wall of the stylus shaft; and
   f) a deformable plunger within the interior space, the plunger having one of an electrically-conducting fluid, an electrically-conducting gel, and an amorphous vessel whose surface is electrically conductive;
   wherein contacting the activation buttons cause the fluid to be displaced within the interior space and the plunger to be deformed against the interior wall of the stylus shaft.

8. The stylus of claim 7, wherein the plunger is recessed within the interior space of the stylus shaft when not all three activation buttons are pressed simultaneously, and the plunger protrudes from the interior space when the three buttons are pressed simultaneously.

9. The stylus of claim 1, wherein the activation button is a mechanical switch which triggers an electronic response in the stylus, and the stylus actuator is a battery-powered solenoid.

10. An electronic grip-enabled stylus comprising:
    a) a stylus shaft;
    b) a stylus tip;
    c) first, second, and third sensors distributed around a perimeter of the stylus shaft;
    d) a stylus actuator; and
    e) logic connected to the plurality of sensors, the logic configured to:
       i) receive first, second, and third signals from the first, second, and third sensors respectively, the first, second, and third signals indicating that the sensors detect the presence of a finger,
       ii) determine that the first, second, and third signals are being received simultaneously, and
       iii) cause the actuator to activate the stylus tip in response to the determining step.

11. The stylus of claim 10, wherein the sensors comprise one of capacitive touch sensors, resistance sensors, heat sensors, pressure sensors, and light sensors.

12. The stylus of claim 10, wherein the stylus further comprises an indicator, and the logic connected to the sensors is further configured to activate the indicator in response to determining that the first, second, and third signals are being received simultaneously.

13. The stylus of claim 12, wherein the indicator is one of a light indicator, a sound indicator, and a vibrating indicator.

14. The stylus of claim 10, wherein the logic causes the actuator to deactivate the stylus tip whenever the determining step determines that the first, second, and third signals are no longer being received simultaneously.

15. A method for activating a touchscreen stylus, the method comprising:
    a) contacting a first finger with a first activation button on the stylus;
    b) contacting a second finger with a second activation button on the stylus while the first finger contacts the first button;
    c) contacting a third finger with a third activation button on the stylus while the first and second fingers contact the first and second buttons respectively; and
    d) activating a tip of the stylus in response to the first, second, and third buttons being simultaneously contacted.

16. The method of claim 15, wherein the first, second, and third activation buttons are mechanical buttons that protrude from the stylus shaft when a finger is not contacting the button, and retract into an interior of the stylus shaft when a finger exerts a force on the button.

17. The method of claim 15, wherein the first, second, and third activation buttons are sensors which sense the presence of a finger contacting an exterior surface of the stylus.

18. The method of claim 17, wherein the sensors are one of capacitive sensors, resistive sensors, pressure sensors, heat sensors, and light sensors.

19. The method of claim 15, wherein the stylus tip is activated by an electrical connection between a hand and the stylus tip.

20. The method of claim 15, wherein the stylus tip is activated by a solenoid powered by a battery.

21. The method of claim 15, wherein the first, second, and third activation buttons include at least one mechanical switch and at least one sensor, the sensor being one of a capacitive sensor, a resistive sensor, a heat sensor, a pressure sensor, and a light sensor.

22. The method of claim 15, further comprising:
    e) deactivating the tip of the stylus whenever the first, second, and third buttons are no longer being simultaneously contacted.

* * * * *